United States Patent [19]

Drake

[11] Patent Number: 4,524,985

[45] Date of Patent: Jun. 25, 1985

[54] CART ANTI-THEFT DEVICE

[76] Inventor: Daniel Drake, 1915½ Addison St., #104, Berkeley, Calif. 94704

[21] Appl. No.: 484,219

[22] Filed: Apr. 12, 1983

[51] Int. Cl.³ .............................................. B62B 39/00
[52] U.S. Cl. ................... 280/33.99 C; 188/5; 280/DIG. 4
[58] Field of Search ................. 280/33.99 C, DIG. 4; 188/31, 5, 7, 110, 111

[56] References Cited

U.S. PATENT DOCUMENTS

| | | | |
|---|---|---|---|
| 2,106,424 | 1/1938 | Einfalt | 188/111 |
| 2,808,128 | 10/1957 | Oles | 188/111 |
| 2,964,140 | 12/1960 | Berezny | 188/111 |
| 3,031,037 | 4/1962 | Stollman | 188/111 |
| 3,031,038 | 4/1962 | Chait | 188/111 |
| 3,090,470 | 5/1963 | Abrams | 188/110 |
| 3,117,655 | 1/1964 | Skupas et al. | 280/33.99 C |
| 3,201,139 | 8/1965 | Turlington | 280/33.99 C |
| 3,265,157 | 9/1966 | Rissler | 186/1 |
| 3,272,527 | 9/1966 | Martin | 280/33.99 C |
| 3,459,280 | 8/1969 | Grimm | 280/33.99 C |
| 3,495,688 | 2/1970 | Isaacks | 188/31 |
| 3,608,693 | 9/1971 | Stosberg et al. | 188/5 |
| 3,719,370 | 3/1973 | Gintick et al. | 280/33.99 C |
| 3,772,994 | 11/1973 | Juarbe | 280/33.99 C |
| 3,892,295 | 7/1975 | Hahto | 188/111 |
| 4,199,043 | 4/1980 | Lankester et al. | 280/33.99 C |
| 4,242,668 | 12/1980 | Herzog | 188/5 |

FOREIGN PATENT DOCUMENTS

| | | | |
|---|---|---|---|
| 730591 | 3/1966 | Canada | 280/33.99 C |
| 2082700A | 3/1982 | United Kingdom | 188/6 |

Primary Examiner—Joseph F. Peters, Jr.
Assistant Examiner—Everett G. Diederiks, Jr.
Attorney, Agent, or Firm—John A. Bucher

[57] ABSTRACT

An arrest device for a wheeled cart, such as a supermarket shopping cart. The device includes a hook and structure mounting the hook on the cart for swinging thereon in a front-to-back direction. The region where such swinging occurs is shiftable between lowered and raised positions to permit the hook to "walk" over surface irregularities by a compound swinging/shifting movement. In one embodiment, the mounting structure includes a leg pivotably attached at one end to the cart and at its other end to the hook. In another embodiment, the hook and connecting structure are formed as a unitary member having a slot which accomodates both swinging and vertical shifting of the hook with respect to the cart. In still another embodiment, the connecting structure takes the form of a spring which is continuously flexible in a front-to-back direction with respect to the cart.

27 Claims, 13 Drawing Figures

CART ANTI-THEFT DEVICE

BACKGROUND AND SUMMARY

The present invention relates to an arrest or anti-theft device for use on wheeled carts, such as shopping carts.

A problem faced by supermarkets and other stores which provide wheeled carts is cart loss due to theft or inadvertent removal. Many stores have attempted to minimize cart loss by installing cart barriers—typically composed of two or more closely spaced posts—which prevent passage of carts out of designated store areas. Since barriers of this type cannot be used in parking area driveways, the carts are confined to non-parking-lot areas of the store, often to the inconvenience of shoppers. Further, the narrowly spaced posts prevent wheelchair access to the store area.

Cart anti-theft devices which are compatible for use in driveways and other wide-access regions of a store area have also been proposed. One type of device proposed includes a hill-and-valley ground structure for capturing cart wheels or for bringing fixed-position brake pads on a cart into contact with the ground surface to arrest cart motion. The disadvantage of this type of device is that the hill-and-valley structure in a walkway or driveway may tend to trip people walking across the structure. Additionally, it may be difficult to disengage the cart from the structure and return it to allowed-access regions of the store.

Another type of cart anti-theft device which has been proposed in the prior art includes a wheel lock in one or more of the cart wheels. A ground follower in the device is used to sense a recess in the ground surface, and thereby actuate the lock. Wheel locking devices of this type are generally complex and relatively expensive to maintain in proper working order. Also, the wheel lock may be actuated inadvertently by a variety of events, such as raising an end of the cart, which could occur within the allowed-access regions of the store.

A third general type of anti-theft device designed to prevent shopping cart removal involves magnetic or electronic-signal activated wheel locks or alarms. Devices such as this are generally expensive to install and operate.

It is an object of the invention, therefore, to provide a cart anti-theft device which substantially overcomes above-mentioned limitations and disadvantages in cart anti-theft devices which have been proposed in the prior art.

A more particular object of the invention is to provide such a device which may include a substantially planar, ground-level grate.

Another object of the invention is to provide such a device which can function to arrest cart movement in specific direction only, permitting movement of an arrested cart readily back into an allowed-access region of a store or the like.

Another object of the invention is to provide such a device having a grate-engageable hook which can ride along a ground surface during normal cart use without becoming caught on surface irregularities, such as a door threshold or the like.

Yet another object of the invention is to provide such a device which is relatively inexpensive in manufacture, easily installed, and relatively maintenance free.

The arrest, or anti-theft device of the present invention includes a hook, connecting structure mounting the hook on a cart, and a ground-surface grate for engaging the hook, to arrest cart movement. The connecting structure has a pivoting region which accommodates swinging of the hook in a front-to-back direction with respect to the cart, and a shifting region which accommodates movement of the pivoting region between lowered and raised positions.

In one embodiment of the invention, the connecting structure comprises an elongated leg pivotably connected at its upper and lower ends to the cart and hook, respectively. The upper and lower pivot connections define the shifting and pivoting regions in the device, respectively.

In another embodiment of the invention, the hook is rigidly attached to the connecting structure, which is pivotally mounted on the cart by means of a pin extending through a slot in the structure. The slot is dimensioned to accommodate pivoting about the pin and shifting of the pin translationally within the slot.

In a third embodiment, the connecting structure includes an elongate spring connected at its upper and lower ends to the cart and hook, respectively. A flexible central portion of the spring defines the pivoting region of the connecting structure. This pivoting region is shiftable between lowered and raised positions either by pivoting of the spring at its point of connection to the cart, or by bending in the spring adjacent its point of connection to the cart, where the spring is rigidly attached to the cart.

These and other objects and features of the present invention will become more fully apparent when the following detailed description of preferred embodiments of the invention are read in connection with the accompanying drawings.

DETAILED DESCRIPTION OF THE INVENTION

Figure 1:
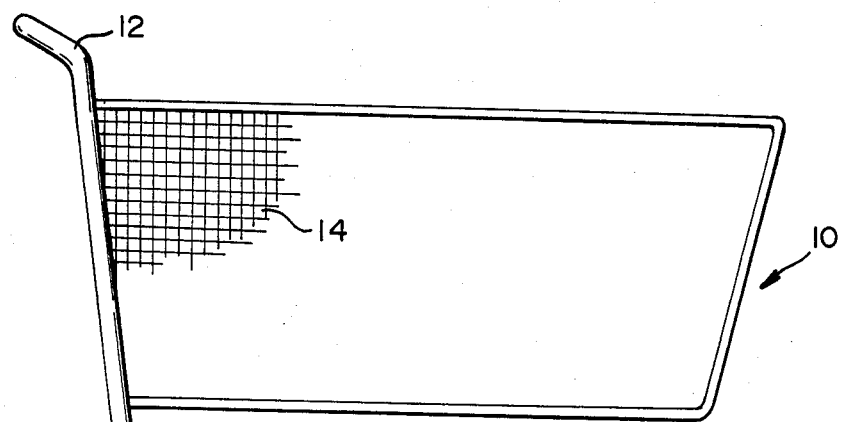
FIG. 1 is a side view of a shopping cart having front and back hooking assemblies constructed according to one embodiment of the invention, and a fragmentary cross-sectional view of a grate which a hooking assembly can engage to arrest cart movement in left-to-right directions in the figure.

FIG. 1 shows a conventional shopping cart 10 having a handle 12, a basket 14, and lower frame 16 which provides additional carrying space in the cart. Frame 16 is constructed typically as a unitary, U-shaped tubular member composed of opposed side members, such as side member 18 seen in FIG. 1, which extend in a front-to-back direction in the cart and converge slightly in a front-to-back direction, and a front tubular member 20 extending across the front end of the cart between the downwardly bent front ends of the two side members. An enlarged, fragmentary portion of front member 20 is seen in FIG. 2.

The cart has a pair of front caster wheels, such as wheel 22, each of which is freely rotatable about a central axis and freely pivotable about a vertical axis, such as axis 24 about which wheel 22 can pivot. Two rear wheels, such as wheel 26, in the cart are mounted on the cart for rotation about a fixed common axis. With reference to FIG. 3, wheel 26, which is representative, includes a central hub 28 and a rubber tire 30 mounted thereon. The wheel is mounted rotatably on a caster bracket which includes a pair of downwardly extending sides, such as side 32 seen in FIGS. 1 and 2, by an axle 34 extending through the two bracket sides and a central portion of the hub.

Figure 2:
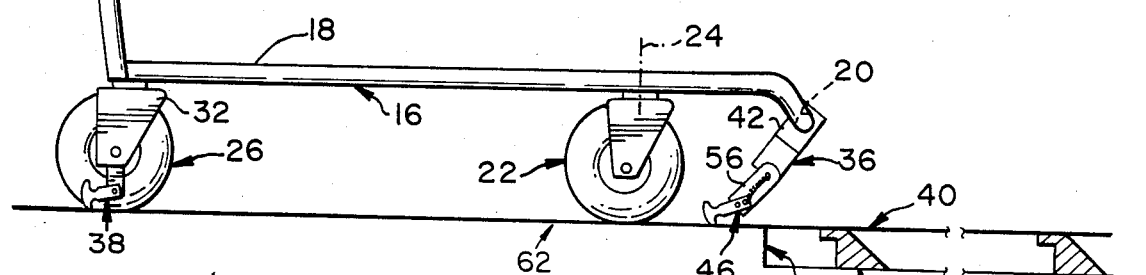
FIG. 2 is an enlarged perspective view of the front hook assembly seen in FIG. 1.
Figure 3:
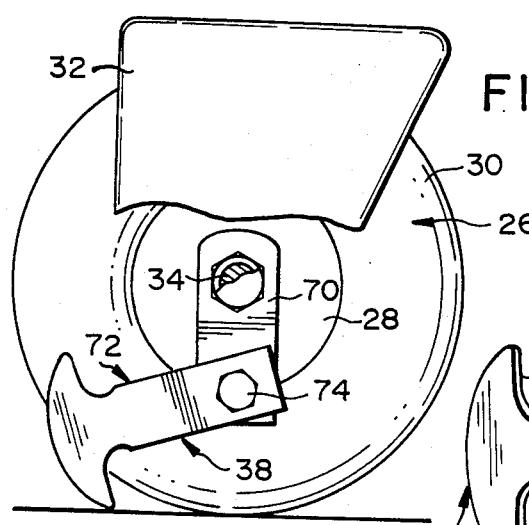
FIG. 3 is an enlarged side view of the back wheel portion of the cart of FIG. 1, and the back hooking assembly associated therewith.
Figure 4:
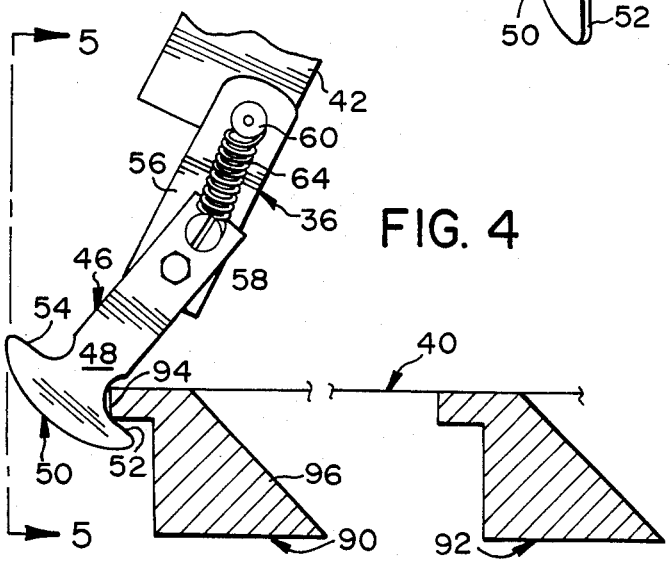
FIG. 4 illustrates in side and cross-sectional views, engagement between the front hooking assembly and the grate in the device of the invention.

A cart arrest, or anti-theft device constructed according to one embodiment of the invention is shown in FIG. 1, with details shown in FIGS. 2-4. The device includes a hooking assembly, such as front assembly 36, carried on the cart, and a surface-placed grate 40 which is engageable by the hooking assembly to arrest cart movement, when the cart is moved across the grate in left-to-right directions in FIG. 1. As seen in FIG. 1, cart 10 carries, in addition to assembly 36 mounted at the cart's front end, a rear hooking assembly 38 mounted adjacent the cart's rear wheel 26. The combination of the anti-theft device—which includes a hooking assembly and a surface-placed grate—with a cart is also referred to herein as an anti-theft cart apparatus.

Referring now to FIG. 2, assembly 36 is mounted on the cart by a mounting clamp 42 which is rigidly attached to member 20 in the cart, as by bolting. Where only one hooking assembly is provided at the front end of the cart, this assembly is preferably positioned midway along member 20. The lower end of clamp 42, below a pivot joint indicated at 44 in FIG. 2, is pivotable about an axis paralleling the clamp's long axis, allowing assembly 36 to swing in sideways directions with respect to the cart.

Assembly 36 includes an anchor-like hook 46 having an elongate shank 48 and a hooking element 50 formed integrally therewith. The hooking element defines opposed, symmetrical, front and back hooking surfaces 52, 54 respectively. Each hooking surface is somewhat cane shaped in side view, as seen in FIG. 4.

The hook in assembly 36 is mounted on cart 10 by connecting structure including an elongate leg 56 pivotally connecting the hook to clamp 42. Specifically, the hook is pivotally mounted on the lower end of the leg in FIGS. 2, 4 by a rivet 58, for swinging about an axis normal to a plane contained in the hook. This pivotal connection is also referred to herein as pivoting means in the connecting structure. The upper end of the leg is pivotally connected to clamp 42 by a pin 60, for pivoting about a second axis paralleling the pivoting means axis. The upper pivotal connection permits swinging of the lower end of the leg between lowered and raised positions and is referred to herein as shifting means accommodating shifting of the pivoting means between lowered and raised positions.

It can be appreciated that when clamp 42 is positioned, as shown in FIGS. 1, 2 and 4, such that the two pivotal axes in the connecting structure are parallel to member 20 in the cart, each pivotal connection in leg 56 accommodates swinging of the hook in a front-to-back direction with respect to the cart.

The construction and cart mounting of the assembly 36 is such that the hook in the assembly rests on a cart-supporting ground surface, indicated at 62, during normal cart use. Preferably the length of a fully extended assembly is about one inch greater than the distance between surface 62 and the assembly's attachment to the cart at pin 60, and such distance is preferably equal to the radius of an adjacent cart wheel.

Hook 46 is urged toward a position of axial alignment with leg 56 by a tension spring 64 connecting pivot pin 60 to an upper end portion of shank 48, as shown. That is, the spring acts to urge the assembly toward a fully extended position. The spring is also referred to herein as spring means.

Looking now at FIG. 3, rear assembly 38 includes a leg 70 and a hook 72 pivotably attached to the lower end of the leg in the figure by a rivet 74. The construction of the rear assembly is substantially identical to the above-described front assembly 36. The upper end of leg 70 in the figure is pivotally carried on axle 34 in the rear wheel. Both pivotal connections involving leg 70 permit swinging of the hook in a front-to-back direction with respect to the cart. The rear assembly may also include a spring (not shown) which functions in a manner similar to spring 64 to urge the assembly toward a fully extended condition.

The two assemblies just described are preferably formed a lightweight metal or molded plastic components. Stamped aluminum components are used in one preferred assembly construction.

Figure 5:
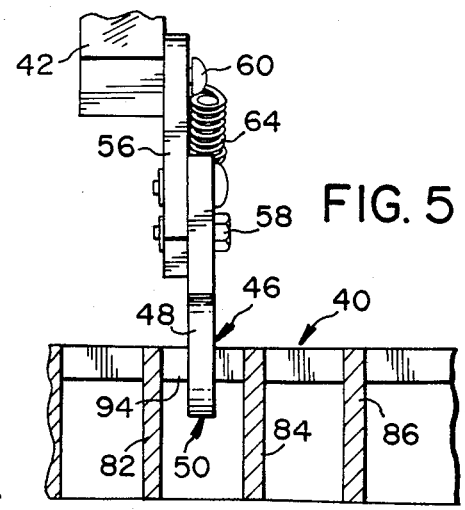
FIG. 5 is a sectional view taken generally along line 5—5 in FIG. 4.

Grate 40 in the device of the invention will be described with reference to FIGS. 1, 4 and 5. The grate is composed of a plurality of parallel bars, such as bars 82, 84, 86 in FIG. 5 which extend between the front, entrance side of the grate, indicated at 88 in FIG. 1, and the back, exit side of the grate (not shown). As seen in FIG. 5, the spacing between the bars is sufficient to allow the hooking end portion of a hook, such as hook 46 in assembly 36, to fall between adjacent bars as the assembly is moved across the grate. The front-to-back dimension of the grate is preferably somewhat greater than the front-to-back distance between front and back hooking assemblies in a cart, and more preferably, between about one foot and three feet longer, for a reason which will be described below.

The hook-engaging elements in the grate include a plurality of crosspieces, such as cross pieces 90, 92 seen in FIGS. 1, 4. With reference to FIG. 4, crosspiece 90, which is representative, has an upstream lip 94 extending between associated bars, (here bars 82, 84) and projecting in a downstream direction (to the left in FIG. 4) a distance which is sufficient to produce hooking engagement with hook 46 in a manner to be described.

Crosspiece 90 further includes an angled downstream face 96 which slopes upwardly on progressing in an upstream direction, as shown. The angled faces in the crosspieces allow a hook, such as hook 46, to move in a right-to-left direction in the figure slidably across the grate, without becoming hookingly engaged therewith. The longitudinal spacing between adjacent crosspieces is preferably between about four and eight inches. The grate is preferably formed from a durable, weather-resistant material, such as steel or the like, and is preferably integrally molded or cast. The grate, which is also referred to as hooking means, may be placed in the ground, in the manner illustrated in FIG. 1, so that its upper surface is flush with the adjacent ground surface.

The operation of the anti-theft device of the invention in preventing cart removal can be appreciated with reference to FIG. 4. As the cart is moved across the grate in a generally entrance-to-exit direction, the lower, hooking portion of the assembly falls under the influence of gravity, into one of the elongate spaces between grate bars, wherein the assembly is substantially vertically disposed. The hooking element is now positioned below the upstream lip in a grate crosspiece, and preferably about an inch below the upper surface of the grate. Here it is noted that where the cart is pushed across the grate in a angled direction with respect to the grate bars, swiveling in clamp 42 permits the hook to swivel to a position where the swinging plane of the assembly is aligned with the elongate spaces between the grate bars, allowing the hook to swing down to a hooking position between the grate bars.

Continued movement of the cart in a direction which carries the hooking element toward the right in FIG. 4 produces a hooking engagement of hook 52 and, more particularly, hooking surface 52, with crosspiece 90, as shown, to arrest the movement of the cart. Further cart movement across the grate in an entrance-to-exit direction is thereby prevented. Should the hook fail to engage the first-encountered crosspiece, continued hook contact with successive crosspieces will guarantee locking engagement between the cart and the grate. Pulling the cart across the grate back-end (handle) first is also prohibited, since hooking surface 54 in the hook is then brought into hooking engagement with the grate.

Additional locking assemblies on the cart, such as assembly 38, act to insure cart locking at one cart end at least. For example, if a cart user attempted to defeat engagement of the front assembly with the grate by tipping the cart upwardly on its rear wheels (to raise the front lock assembly above the grate surface) the rear locking assembly would eventually engage the grate to arrest cart movement. Since the front-to-back dimension of the grate is greater than the front-to-back distance between the two hooking assemblies, at least one of the assemblies must engage the grate.

Attaching a third hooking assembly (not shown) adjacent the other rear wheel in the cart would prevent the cart from being moved across the grate by tipping the cart on two side wheels.

A cart whose motion has been arrested by locking engagement of a hooking assembly with the grate can be moved off the grate easily in a exit-to-entrance direction (toward the left in FIG. 4). Pushing or pulling a locked cart toward the entrance side of the grate brings the assembly hook into contact with the sloped, downstream faces of successive crosspieces, with the hook easily sliding over the crosspieces.

As described above, a hooking assembly in the device of the invention is constructed and mounted to rest at an angled position on the cart-supporting ground surface during normal cart use. It has just been seen that this feature allows the assembly to "fall" into the interstices of a planar ground-level grate to produce locking engagement with the grate. According to another important feature of the invention, the novel construction in a hooking assembly allows the same to move readily across a floor surface, in its angled position, without becoming snagged on or jammed against floor surface irregularities.

Figures 6A, 6B, 6C:
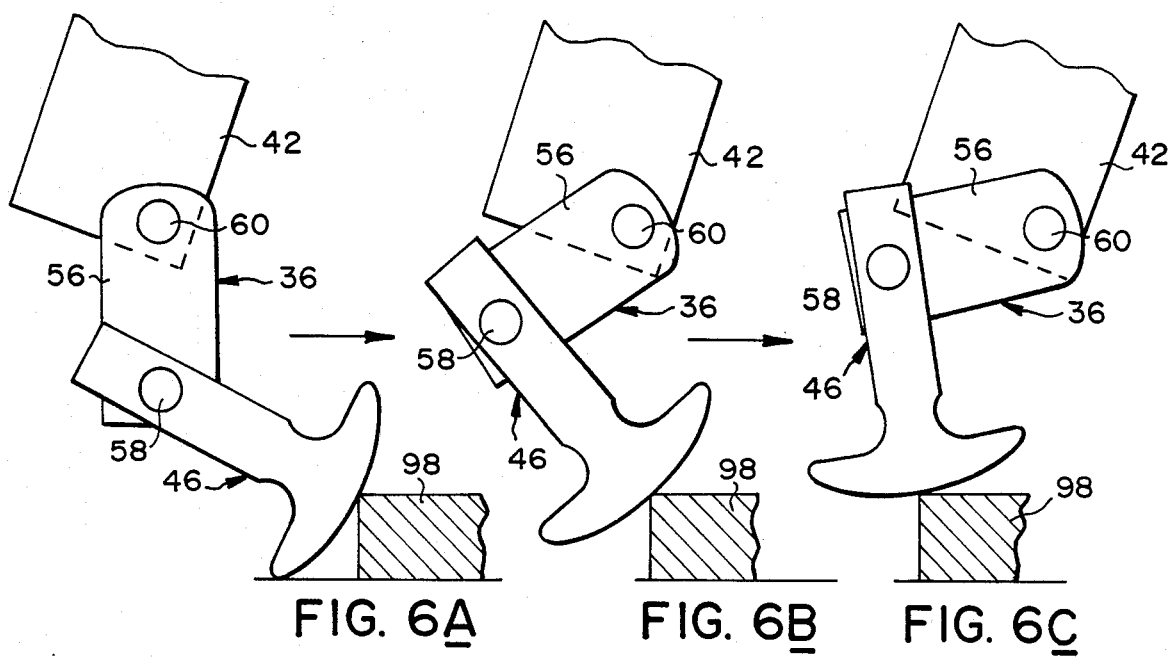
FIGS. 6A–6C illustrate contact between a hooking assembly, with such extended in the direction of cart movement, and a raised ground-surface obstruction, and sequential movements in the hooking assembly in passing over the obstruction without hooking engagement therewith.

FIGS. 6A-6C illustrate the sequence of movements in an assembly, such as assembly 36, as it encounters a raised surface irregularity, such as a raised door threshold, indicated at 98. The assembly shown in FIG. 6A is in a "leading" configuration in which the hook leads the assembly's attachment to the cart at pin 60. When the hook makes initial contact with the threshold, the assembly is in a substantially fully extended position due to the action of spring 66. Further forward movement of the cart to the right in the figure is accommodated by pivoting of leg 56 toward a substantially vertically disposed position shown in FIG. 6A, where the pivotal connection between the hook and the leg is in a lowered position. Continued movement of the cart to the right is accommodated by further shifting of the pivot connection between the hook and the leg toward a raised position, carrying the hook upwardly (FIG. 6B) to a position where it can ride over the threshold, as illustrated in FIG. 6C. The sequence of assembly movements is completed as the assembly flops into the configuration like that shown in FIGS. 1 and 2, where the hooking element trails the pivotal connection of the assembly to the cart. Although the obstacle illustrated in the FIGS. 6A—6C is a raised surface irregularity, it can be appreciated that the same sequence of movement would allow the hooking assembly to pass easily over a recessed surface irregularity, such as a channel in a sidewalk.

Figures 7A, 7B, 7C:
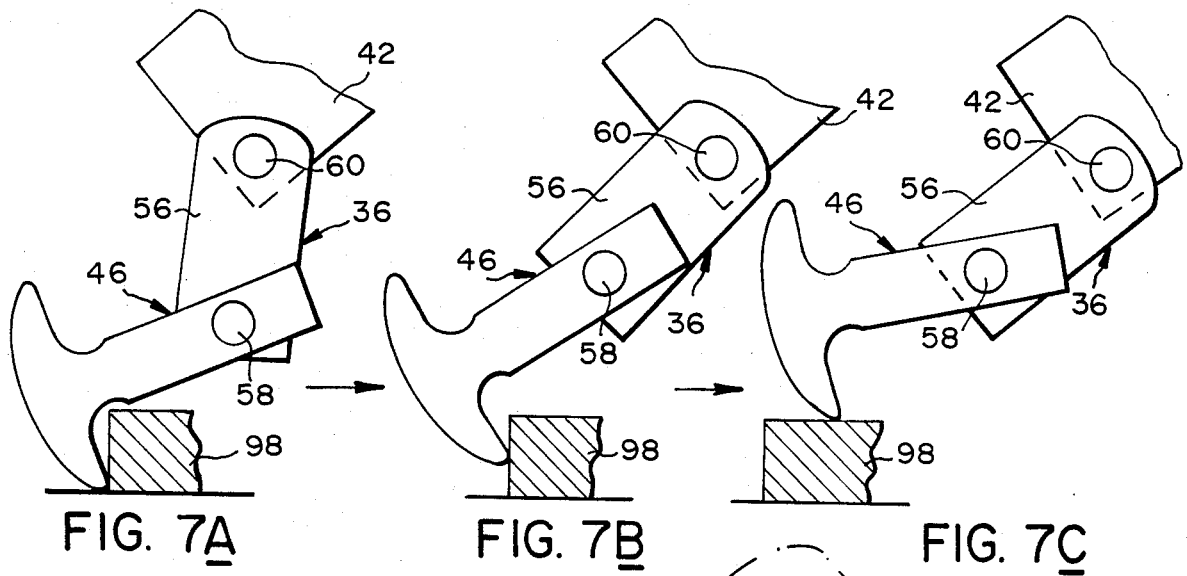
FIGS. 7A–7C illustrate contact between a hooking assembly, with such extended in the direction opposite the direction of cart movement, with a raised ground-surface obstruction, and subsequent movements in the hooking assembly in passing over the obstruction without hooking engagement therewith.

FIGS. 7A—7C illustrate how a hooking assembly, with such in a "trailing" configuration, passes over a surface obstacle, such as threshold 98, without becoming hooked or snagged on the obstacle. FIG. 7A illustrates one condition of assembly 36 as hook 46 therein makes initial contact with the obstacle. If, as here, the assembly is not already in a fully extended condition, movement of the cart toward the right in the figures is accommodated initially by upward swinging in leg 46, toward a position like the one shown in FIG. 7B. The leg continues to swing toward a fully extended position until the vertical component acting on the hook is sufficient to draw the hook over the obstacle, as illustrated in FIG. 6B. The swinging movement in the leg also causes a slight rocking movement of the hook against the obstacle surface which aids in carrying the hooks up the side of the obstacle to the position shown in FIG. 7C, where the hook can ride over the obstacle.

Figure 8:
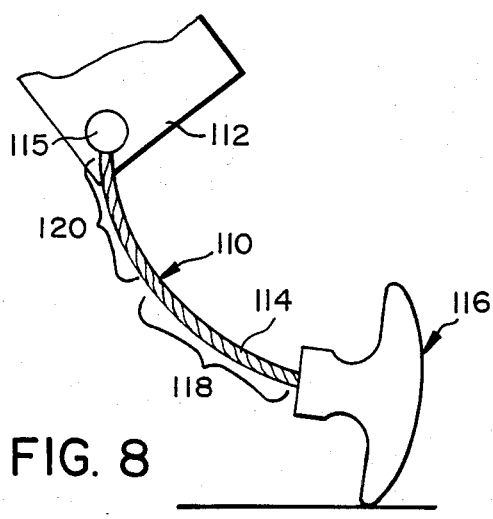
FIG. 8 is a side view of a flexible-spring hooking assembly constructed according to another embodiment of the invention.

A hooking assembly 110 constructed according to a second embodiment of the present invention is shown in side view in FIG. 8. A clamp 112 shown fragmentarily in the figure is constructed substantially like above-described clamp 42 and is used in attaching the assembly to a front frame member in a cart. The assembly includes a hook 116 and connecting structure including a continuously flexible band 114 mounting the hook on the clamp. The construction of hook 116 is substantially like that of hooking element 50 in hook 46. Band 114 includes a ribbon-like spring which tends to assume a linear configuration in an unstressed condition. The length of the band is such as to position hook 116 substantially below the cart-supporting ground surface when the assembly is moved across a grate, such as grate 40.

Band 114 is attached to clamp 112 at 115, either by rigid attachment, or by a pivotal attachment which allows pivoting of the assembly in a front-to-back direction with respect to the cart. It can be appreciated that where the hooking assembly is pivotally attached to clamp 112, the band tends to assume a more linear condition than what is shown in FIG. 8, which illustrates the condition of the assembly where the flexible band is rigidly attached to the clamp. The hook in the assembly may either lead or trail the point of attachment of the assembly to the cart.

In describing the operation of assembly 110, it will be assumed first that band 114 is rigidly attached to clamp 112 at 115, and that all relative movement of hook 116 with respect to the clamp is accommodated by flexing in different regions along the length of the band. Where hook 116 leads the point of connection of the assembly to the cart and the hook encounters a surface irregularity, such as threshold 98 shown in FIGS. 6A–6C, continued cart movement in a forward direction is accommodated initially by bending in the band away from the direction of cart movement, in a lower band-flexing region indicated at 118, and in an upper band-flexing region indicated at 120. With continued cart movement, the lower flexing region 118 is bent rearwardly and upwardly by flexing in region 120, allowing the hook to "walk" over the raised obstacle substantially as described with reference to assembly 36 in FIGS. 6A–6C.

It can be appreciated from the foregoing that lower flexing zone 118 acts as a pivoting region, analogous to the pivoting means at rivet 58 in assembly 36, accommodating swinging of the hook in a front-to-back direction with respect to the cart. Band-flexing region 120 by accommodating shifting of region 118 between lowered and raised positions, as the upper shifting region moves toward and away from a position of alignment with a vertical axis, provides shifting means functionally analogous to the shifting means at pin 60 in assembly 36. Regions 118, 120 are also referred to as pivoting means and shifting means, respectively.

Where the hooking assembly is pivotably connected to clamp 112, the just-mentioned shifting means in the assembly is provided by the pivotal attachment of band 114 to the clamp. That is, pivoting of hook 116 is accommodated by flexing in the region corresponding substantially to region 118, and the shifting which carries region 118 between lowered and raised position occurs by swinging of the band at its pivotal attachment to the cart.

The manner in which assembly 110 engages a grate, such as grate 40, and becomes locked thereto is substantially identical to what has been described with reference to assembly 36. As a cart equipped with the assembly is moved across a grate, the hook springs downwardly to engage a crosspiece. Hooking engagement with an upstream lip in one of the crosspieces locks the cart against further movement toward the exit end of the grate. The arrested cart can be moved easily off the grate in an exit-to-entrance direction due to the ability of the hook to slide easily over the sloping, downstream faces of the grate crosspieces.

Figure 9:
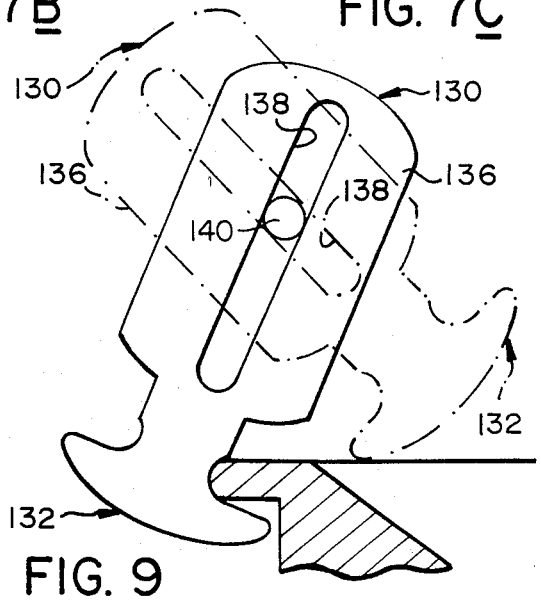
FIG. 9 is a side view of yet another type of hooking structure constructed in accordance with the invention.

A hook assembly 130 constructed according to a third embodiment of the invention is shown in side, somewhat simplified view in FIG. 9. The assembly includes a hook 132 integrally formed with a plate 136, which forms the connecting structure in the assembly. An elongate slot 138 formed in the plate and extending through the center thereof is dimensioned for pivoting and sliding with respect to a pin 140 used in attaching the assembly to a cart. Pin 140 may be a wheel axle, or a pin, similar to pin 60, attaching the assembly to a clamp on the cart. The plate is preferably constrained against out-of-plane movement on the pin by a pair of washers or the like (not shown) rigidly attached to the pin on either side of the plate.

Under normal use, when a cart is being moved across a floor surface, hook 132 in the assembly is in sliding contact with the floor surface, supporting a assembly at the position like that shown in dotted lines in the figure. The assembly may be in a configuration where the hook either leads or trails the assembly's pivotal attachment to the cart at pin 140.

During normal cart use, when the hook is in a position which leads the pivotal attachment of the assembly to the cart, contact of the hook with an obstacle is accommodated initially by upward and rearward movement of the assembly with respect to the cart, as the lower end of the slot moves toward pin 140, and the plate rotates slightly on the pin. The combined rotational/shifting movement in the assembly allows the hook to walk over the irregularity in the ground surface in essentially the same manner as described with reference to FIGS. 6A–6C. In particular, the critical event is shifting of the pivoting region of the hook upwardly to a position where the hook can roll onto, and over the upper surface of the irregularity, as in FIGS. 6B and 6C.

Where the hook in assembly 130 trails pin 140, the sequence of assembly movements allowing the hook to walk over a ground irregularity is like that shown in FIGS. 7A–7C. Initially, contact with the irregularity produces an upward shifting of the pivot region of the assembly (by movement of the lower end of the slot toward pin 140) until the upward component of the force produced by cart movement is sufficient to raise the hook over the side of irregularity.

The point at which assembly 130 pivots about pin 140 is also referred to herein as pivoting means. Such means is shiftable from a lowered position, where pin 140 rests against the upper end of the slot in FIG. 9 to raised positions as the slot's lower end moves toward the pin. The sliding movement of the pin in the slot thus provides means for shifting the just-mentioned pivoting means between lowered and raised positions.

When the cart is moved across a grate in the device, such as grate 40 described above, the assembly falls, under the influence of gravity, to a position where the hook is positioned to engage the upstream lip of a crosspiece in the grate, as shown in solid lines in FIG. 9. The hook assembly is releasable from, and able to slide easily over grate crosspieces when the assembly is moved in an exit-to-entrance direction over the grate substantially as described with reference to assembly 36.

From the foregoing, it can be appreciated how various objects of the invention are met. The device, in each of the embodiments described herein, includes a hook which is adapted to slide along the cart-supporting ground surface during normal use. Connecting structure connecting the hook to the cart accommodates both pivoting and shifting movement of the hook in directions which allow the hook to walk easily over ground-surface obstacles, both when the hook is leading and trailing the assembly's point of attachment to the cart.

The construction and mounting of the assembly is designed to permit the hook to fall, under the influence of gravity and/or spring biasing, to a below-surface position when the assembly encounters a grate in the device. The hook is then positioned to engage a hooking member in the grate as the cart is moved in specified directions. In the particular grate construction described herein, and where the hooking assembly is connected to the cart for side-to-side swinging, the specified directions include substantially all directions which carry to cart from the entrance to the exit side of the grate.

Because the hook rides along the ground surface and is adapted to fall into below-ground interstices in the grate, the grate may be constructed to have a planar surface, and be placed in the ground so that its upper surface is flush with ground. The grate therefore presents no hazard to store customers walking across the grate.

After cart motion has been arrested by locking engagement of the locking assembly with a grate, the cart can easily be moved back into a cart authorized store area by moving the cart in a generally exit-to-entrance entrance direction across the grate.

A cart can be provided with two or more hooking assemblies, to prevent the locking capability of one of the hooking assemblies from be circumvented by tilting the cart on front, back or side pairs of wheels when passing over the grate.

Each of the three embodiments described herein is simple in construction and operation, and each can be produced, installed and maintained at relatively low cost.

While preferred embodiments of the invention have been described herein, it will be appreciated that various modifications and changes can be made without departing from the spirit of the invention.

What is claimed is:

1. An arrest device for a wheeled cart comprising a hook,
   connecting structure adapted to mount said hook on the cart, said structure including pivoting means adapted to accommodate swinging of said hook in a front-to-back direction with respect to the cart, and shifting means adapted to be shiftable with respect to the cart to accommodate shifting of said pivoting means between lowered and raised positions, said connecting structure also including a leg having said hook pivotally attached thereto by said pivoting means for pivoting about one axis, said leg being pivotally attached to the cart by said shifting means for pivoting about a second axis substantially parallel to the first axis, and
   hooking means adapted to be placed on the ground to engage said hook when said cart is moved across the hooking means in specified directions.

2. The device of claim 1 wherein said hook is adapted to remain in contact with the cart-supporting ground surface as said pivoting means is shifted between its lowered and raised positions.

3. The device of claim 2 wherein said leg is adapted to be mounted adjacent one of the cart wheels at a position where said second axis substantially parallels and is spaced above the cart-supporting ground surface a distance substantially equal to that of the rotational axis of said one of the cart wheels from the ground surface.

4. The device of claim 1 wherein the cart has a wheel rotatably carried on an axle, said leg being mounted pivotally on said axle.

5. The device of claim 1 further comprising spring means operatively connecting said hook and said leg to bias the hook towards a fully extended position with respect to the leg.

6. The device of claim 1 wherein the cart has front and back ends, said hook defining first and second opposed hooking surfaces which are adapted to be engaged by said hooking means as the cart to which the device is attached is moved across the hooking means in such specified directions, both front-end and back-end first, respectively.

7. The device of claim 1, wherein said hooking means includes a grate having a series of parallel bars between which said hook can fall, below the plane of the cart-supporting ground surface, and a crosspiece positioned to intersect said bars, and having an upstream lip for engaging said hook when the cart is moved across the grate in one of the specified directions, with said grate placed on the ground.

8. The device of claim 1 wherein said crosspiece has a downstream surface adapted to contact said hook slidably and releasably when said cart is moved across the grate in directions opposite said specified directions.

9. An arrest device for a wheeled cart comprising a hook,
   connecting structure adapted to mount said hook on the cart, said structure including pivoting means adapted to accommodate swinging of said hook in a front-to-back direction with respect to the cart, and shifting means adapted to be shiftable with respect to the cart to accommodate shifting of said pivoting means between lowered and raised positions, said connecting structure also including an elongate connector, said pivoting means and said shifting means forming first and second longitudinally spaced flexing zones in the connector, respectively, and
   hooking means adapted to be placed on the ground to engage said hook when said cart is moved across the hooking means in specified directions.

10. The device of claim 9, wherein said connector includes an elongate element which, when attached to the cart, is substantially continuously flexible in a front-to-back direction with respect to the cart.

11. An arrest device for a wheeled cart comprising a hook,
    connecting structure adapted to mount said hook on the cart, said structure including pivoting means adapted to accommodate swinging of said hook in a front-to-back direction with respect to the cart, and shifting means adpated to be shiftable with respect to the cart to accommodate shifting of said pivoting means between lowered and raised positions, said connecting structure also including an elongate connector, said pivot means forming a flexing zone in said connector, and said shifting means being adapted for pivoting in a front-to-back direction with respect to the cart, and
    hooking means adapted to be placed on the ground to engage said hook when said cart is moved across said hooking means in specified directions.

12. The device of claim 11 wherein said connector also comprises an elongate, substantially continuously flexible element.

13. An arrest device for a wheeled cart comprising a hook,
connecting structure adapted to mount said hook on the cart, said structure including pivoting means adapted to accommodate swinging of said hook in a front-to-back direction with respect to the cart, and shifting means adapted to be shiftable with respect to the cart to accommodate shifting of said pivoting means between lowered and raised positions, said connecting structure also including a plate having an internal slot adapted to receive a cart-mounted pin therethrough to mount said plate on the cart for pivoting about said pin in a front-to-back direction, and for translational shifting with respect to said pin to shift the pivoting region of said plate on said pin between lowered and raised positions, and
hooking means adapted to be placed on the ground to engage said hook when the cart is moved across said hooking means in specified directions.

14. The device of claim 13 wherein said hook is rigidly attached to said plate.

15. An arrest device for a cart having front and back wheels, the device comprising
a hook,
structure adapted for mounting said hook on the cart, said structure comprising means for accommodating pivoting of said hook in a front-to-back direction with respect to the cart, shifting of said pivot accommodating means between lowered and raised positions, said structure also including a leg having said hook pivotally attached thereto to accommodate said pivoting, said leg being pivotally mounted on the cart to accommodate said shifting, and
hooking means adapted to be placed on the ground to engage said hook when said cart is moved across said hooking means in specified directions.

16. The device of claim 15 wherein said leg is mounted adjacent a wheel on the cart for swinging with respect thereto about the wheel's rotational axis.

17. An arrest device for a cart having front and back wheels, said device comprising
a hook,
structure adapted for mounting said hook on the cart, said structure comprising means for accommodating pivoting of said hook in a front-to-back direction with respect to the cart, said structure comprising additional means for accommodating shifting of said pivot accommodating means between lowered and raised positions, said structure also including an elongate substantially continuously flexible element having said hook attached at one thereof said pivoting being accommodated by flexing in a central portion of said element, and
hooking means adapted to be placed on the ground to engage said hook when said cart is moved across said hooking means in specified directions.

18. The device of claim 17 wherein one end of said element is rigidly mounted on the cart, and wherein shifting is accommodated by flexing in a region of said element adjacent its attachment to the cart.

19. The device of claim 17 wherein said element is pivotally mounted on the cart, and wherein shifting is accommodated by said pivotal mounting of said element.

20. An arrest device for a cart having front and back wheels, said device comprising
a hook,
structure adapted for mounting said hook on the cart, said structure comprising means for accommodating pivoting of said hook in a front-to-back direction with respect to the cart, said structure comprising additional means for accommodating shifting of said pivot accommodating means between the lowered and raised positions, said structure also comprises a plate having an internal slot adapted to receive a cart-mounted pin therethrough, said pivoting being accommodated by pivoting of said plate about said pin, said shifting being accommodated by translational movement of said pin with respect to said slot, and
hooking means adapted to be placed on the ground to engage said hook when said cart is moved across said hooking means in specified directions.

21. Anti-theft cart apparatus comprising a cart having front and back wheels adjacent front and back cart ends, respectively,
a hooking assembly including a hook and connecting structure mounting said hook on the cart, said structure including pivoting means accommodating swinging of said hook in a front-to-back direction with respect to the cart and means shiftable with respect to the cart to accommodate shifting of said pivoting means between lowered and raised positions, said connecting structure also including a leg having said hook pivotally attached thereto by said pivoting means, said leg being pivotally attached to the cart by said shifting means,
hooking means mounted on the ground surface and adapted to engage said hook to arrest cart movement when the cart is moved across said hooking means in specified directions, and
means mounted on the cart for arresting cart movement when the cart is tipped in a front-to-back direction to raise said hook assembly above a position where engagement with said hooking means can occur.

22. The apparatus of claim 21 wherein said hooking assembly and said arresting means are mounted adjacent opposite ends of the cart.

23. The apparatus of claim 22 wherein said hooking means is a grate and the dimension of said grate, in said specified directions, is greater than the front-to-back distance between said hooking assembly and said arresting means.

24. The apparatus of claim 21 wherein said arresting means also includes a hook and connecting structure mounting said hook on the cart for pivoting and shifting with respect thereto.

25. The apparatus of claim 21 wherein said hook assembly is mounted on the cart by means of a swivel which permits said hook assembly to swivel in a side-to-side direction.

26. Anti-theft cart apparatus comprising a cart having front and back wheels adjacent front and back cart ends, respectively,
a hooking assembly including a hook and connecting structure mounting said hook on the cart, said structure including pivoting means accommodating swinging of said hook in a front-to-back direction with respect to the cart and means shiftable with respect to the cart to accommodate shifting of said pivoting means between lowered and raised positions, said connecting structure also including an elongate, substantially continuously flexible element, hooking means mounted on the ground surface and adapted to engage said hook to arrest cart movement when the cart is moved across said hooking means in specified directions, and means mounted on the cart for arresting cart movement when the cart is tipped in a front-to-back direction to raise said hook assembly above a position where engagement with said hooking means can occur.

27. Anti-theft cart apparatus comprising a cart having front and back wheels adjacent front and back cart ends, respectively, a hooking assembly including a hook and connecting structure mounting said hook on the cart, said structure including pivoting means accommodating swinging of said hook in a front-to-back direction with respect to the cart and means shiftable with respect to the cart to accommodate shifting of said pivoting means between lowered and raised positions, said connecting structure also including a plate having an internal slot which receives a cart-mounted pin therethrough to mount said plate on the cart for pivoting about said pin in a front-to-back direction and for translational shifting with respect to said pin to shift said pivoting means of the plate on said pin between lowered and raised positions, hooking means mounted on the ground surface and adapted to engage said hook to arrest cart movement when the cart is moved across said hooking means in specified directions, and means mounted on the cart for arresting cart movement when the cart is tipped in a front-to-back direction to raise said hook assembly above a position where engagement with said hooking means can occur.

* * * * *